Figure 1:
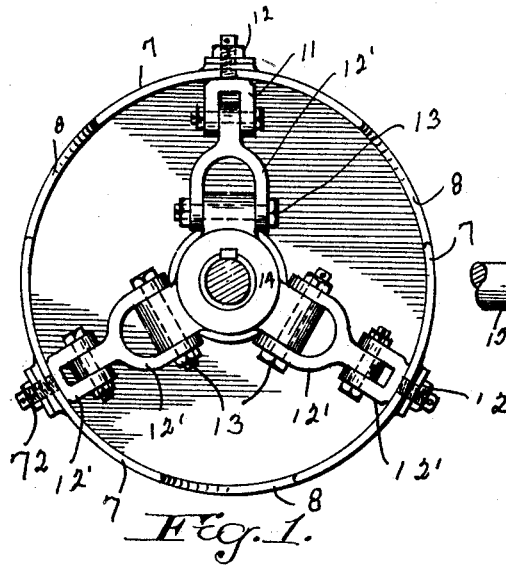

Nov. 24, 1925.

C. F. CLAPHAM 1,562,437

SHAFT COUPLING

Filed March 24, 1923

Witnesses

Inventor
CHARLES F. CLAPHAM

Patented Nov. 24, 1925.

1,562,437

UNITED STATES PATENT OFFICE.

CHARLES F. CLAPHAM, OF BALTIMORE, MARYLAND, ASSIGNOR OF ONE-THIRD TO HIRAM S. MILLER, OF BALTIMORE, MARYLAND.

SHAFT COUPLING.

Application filed March 24, 1923. Serial No. 627,269.

*To all whom it may concern:*

Be it known that CHARLES F. CLAPHAM, a subject of the King of England, residing at Baltimore city and State of Maryland, has invented certain new and useful Improvements in Shaft Couplings, of which the following is a specification.

This invention relates to certain new and useful improvements in a flexible coupling for shafts, and has for its particular object a coupling whereby two shafts may be yieldably connected together so as to permit movement of the shafts in all directions relative to one another.

A further object of the invention is the provision of a coupling capable of being secured to the opposed ends of shafts so as to permit the shafts to be moved out of alignment with one another and have movements in all directions relative to one another.

Another important object of the invention is to provide a coupling having flexible means constituting cantilever beams which permit when the coupling is connected to the opposed ends of the shafts a relative, resilient movement of the shafts in all directions with relation to each other.

A further object of the invention is the provision of a flexible coupling, yieldably connected to the opposed ends of the shafts, whereby said shafts may have relative resilient movements to each other in all directions.

With these and other objects in view the invention consists in certain novel features, combination and arrangement of parts as will be hereinafter more fully described, pointed out in the accompanying drawing and claimed.

In the drawing

Figure 2:
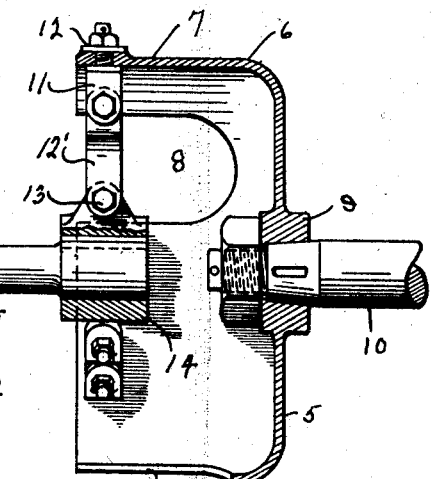
Figure 3:
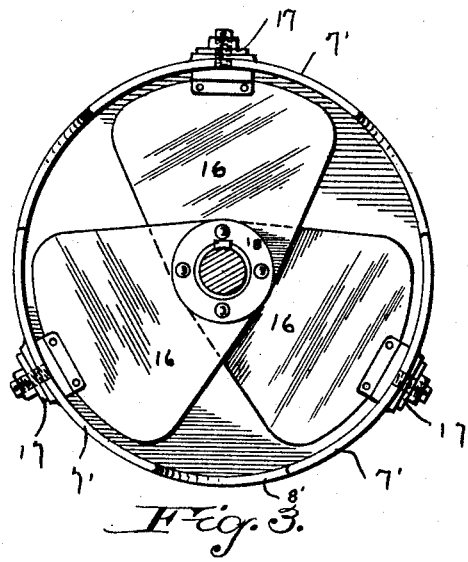
Figure 4:
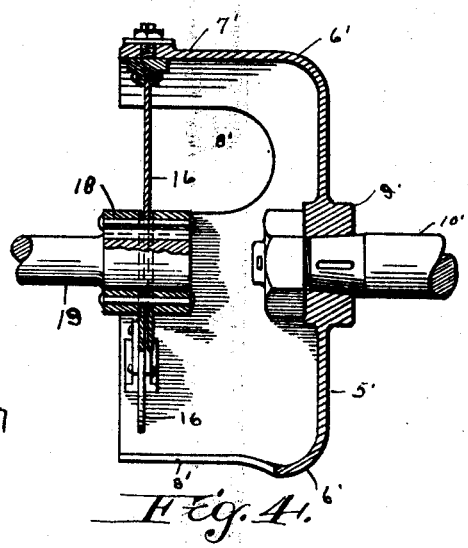

Figure 1 is a front elevational view of my coupling as made in accordance with this invention, Figure 2 is a transverse, longitudinal, sectional view taken through my coupling, Figure 3 is a front elevational view of a modified form of my flexible coupling, and Figure 4 is a transverse, longitudinal, sectional view of the modified form of the invention.

Referring to the drawing, the numeral 5 indicates an annular disc or flange which constitutes the rear wall of the hub of my flexible coupling, and formed from the peripheral edge of this disc or flange is a right angle extending annular flange 6 which is divided to provide resilient overhanging beam portions 7.

The overhanging beam portions 7 are defined in the flange 6 by cutting out portions 8 thereof, so as to give the flange 6 a relatively resilient action due to the flexure of the material from which the flange 6 is formed.

It is to be understood that the hub of the flexible coupling, together with the flange thereof, is stamped from a blank in a single operation and the disc 5 thereof is provided centrally with a boss 9 having a central opening in which is secured a shaft 10.

The shaft 10 is connected in the opening of the boss 9 in such a manner that upon rotation of the shaft the flexible coupling will consequently rotate therewith.

Connected adjacent the outer ends of the cantilever beams 7, are swiveled links 11, which are swivelly connected thereto as at 12, and have pivotally connected to their lower ends, the connecting links 12'.

The free ends of the connecting links 12' are pivotally secured by suitable fastening means 13, such as bolts or the like, to a crosshead 14, which crosshead is keyed to one end of a shaft 15 which is in direct alignment with the opposing connected end of the shaft 10.

It is apparent that when the shaft connected to the crosshead is moved longitudinally to a position on either side of the central position of the connecting links, or if the shafts are running out of alignment, that the flexure in the cantilever beams 7 and movement of the swivelly and pivotally connecting links 11 and 12' will permit of sufficient radial swinging movement to compensate for the position assumed by the shafts as described.

It is evident that the coupling when made as shown in Figures 1 and 2, together with the swivelly connected links 11 and 12', provides a flexible, yieldable coupling which permits of movement of the shafts in all directions relative to one another, due to the resilient action of the cantilever beams 7 and connection of the links 11 and 12 to the crosshead 14.

Referring to the modification shown in Figures 3 and 4, I have provided the same coupling member 5′, which has an annular right angular flange 6′, which flange is divided to provide cantilever beams 7′, which cantilever beams are defined by slots 8′ formed in the flange 6′.

The flange 6′ of the modified form is provided centrally with a boss 9′ having a central opening in which is fixed a shaft 10′ identical with the construction of the preferred forms shown in Figures 1 and 2.

Swivelly connected to the outer ends of the cantilever portions 7′ are suitable blades 16, which blades are swivelly connected as at 17, to the outer ends of the cantilever beams 7′. These blades 16 are secured to a crosshead 18, which crosshead is fixed to a second shaft 19.

The blades 16 are constructed of such material as to permit a flexure in all directions, so as to compensate for the movement of the shaft 19 and shaft 10′, in conjunction with the cantilever beams 7′, in all directions.

Having thus described my invention what I claim as new is:

A coupling of the class described, comprising a disc having its peripheral edge bent to provide a right angle flange, said flange being divided to provide resilient beam portions, a shaft secured to said disc, flexible means pivotally connected to said beams, a second shaft, a crosshead connected to one end of said second shaft, and means flexibly connecting the second shaft of the crosshead to said flexible means, said connection aligning said second shaft with said first shaft and permitting relative movement of said shafts out of alignment with one another.

In testimony whereof he hereunto affixes his signature.

CHARLES F. CLAPHAM.